(12) United States Patent
Singer et al.

(10) Patent No.: US 11,428,813 B2
(45) Date of Patent: *Aug. 30, 2022

(54) LIDAR SYSTEM THAT IS CONFIGURED TO COMPUTE RANGES WITH DIFFERING RANGE RESOLUTIONS

(71) Applicant: GM Cruise Holdings LLC, San Francisco, CA (US)

(72) Inventors: Scott Singer, San Gabriel, CA (US); Lutfollah Maleki, Pasadena, CA (US); Alexander Charles Standridge, Westlake Village, CA (US); Ayan Chakrabarty, Glendora, CA (US)

(73) Assignee: GM CRUISE HOLDINGS LLC, San Francisco, CA (US)

(*) Notice: Subject to any disclaimer, the term of this patent is extended or adjusted under 35 U.S.C. 154(b) by 518 days.

This patent is subject to a terminal disclaimer.

(21) Appl. No.: 16/233,936

(22) Filed: Dec. 27, 2018

(65) Prior Publication Data

US 2020/0200904 A1    Jun. 25, 2020

Related U.S. Application Data

(63) Continuation of application No. 16/227,770, filed on Dec. 20, 2018.

(51) Int. Cl.
*G01S 17/34*    (2020.01)
*G01S 17/931*    (2020.01)
(Continued)

(52) U.S. Cl.
CPC ............. *G01S 17/34* (2020.01); *B60W 10/04* (2013.01); *B60W 10/18* (2013.01); *B60W 10/20* (2013.01);
(Continued)

(58) Field of Classification Search
None
See application file for complete search history.

(56) References Cited

U.S. PATENT DOCUMENTS 7,372,551 B1    5/2008   Delfvett et al.
8,390,506 B2 *  3/2013   Focke .................... G01S 13/345
                                          342/70
(Continued)

FOREIGN PATENT DOCUMENTS

DE    102007043535 A1    3/2009
WO    2016033361 A1     3/2016
WO    2017216581 A1     12/2017

OTHER PUBLICATIONS

"International Search Report for PCT Patent Application No. PCT/US2019/063893", dated Mar. 18, 2020, 4 Pages.
(Continued)

*Primary Examiner* — James M McPherson
*Assistant Examiner* — Bakari Underwood
(74) *Attorney, Agent, or Firm* — Calfee, Halter & Griswold LLP

(57) ABSTRACT

A lidar system is described herein. The lidar system includes a transmitter that is configured to emit a frequency-modulated lidar signal. The lidar system further includes processing circuitry that is configured to compute a distance between the lidar system and an object based upon the frequency-modulated lidar signal, the processing circuitry configured to compute the distance with a first resolution when the distance is at or beneath a predefined threshold, the processing circuitry configured to compute the distance with a second resolution when the distance is above the predefined threshold, wherein the first resolution is different from the second resolution.

20 Claims, 10 Drawing Sheets

(51) Int. Cl.

| | | |
|---|---|---|
| *G01S 7/48* | (2006.01) | |
| *G01S 7/4861* | (2020.01) | |
| *G05D 1/00* | (2006.01) | |
| *G05D 1/02* | (2020.01) | |
| *B60W 10/04* | (2006.01) | |
| *B60W 10/18* | (2012.01) | |
| *B60W 10/20* | (2006.01) | |
| *B60W 30/18* | (2012.01) | |
| *G01S 7/4911* | (2020.01) | |

(52) U.S. Cl.
CPC ........... *B60W 30/18* (2013.01); *G01S 7/4808* (2013.01); *G01S 7/4861* (2013.01); *G01S 7/4911* (2013.01); *G01S 17/931* (2020.01); *G05D 1/0088* (2013.01); *G05D 1/0231* (2013.01); *B60W 2420/52* (2013.01); *B60W 2554/00* (2020.02); *B60W 2710/06* (2013.01); *B60W 2710/08* (2013.01); *B60W 2710/18* (2013.01); *B60W 2710/20* (2013.01)

(56) References Cited

U.S. PATENT DOCUMENTS

| | | |
|---|---|---|
| 8,427,649 B2 | 4/2013 | Hays et al. |
| 8,761,603 B1 | 6/2014 | Maleki |
| 9,229,106 B2 | 1/2016 | Dotson |
| 10,670,395 B2 * | 6/2020 | Deichmann ........... G01S 17/894 |
| 2013/0250273 A1 | 9/2013 | Ludwig |
| 2016/0139257 A1 | 5/2016 | Yamashina |
| 2016/0291134 A1 | 10/2016 | Droz et al. |
| 2016/0299228 A1 | 10/2016 | Maleki et al. |
| 2017/0146648 A1 * | 5/2017 | Lim ...................... G01S 13/931 |
| 2019/0086531 A1 * | 3/2019 | Rick ...................... G01S 13/582 |
| 2020/0057450 A1 * | 2/2020 | Calleija .................. G08G 1/163 |
| 2020/0278432 A1 * | 9/2020 | Thorpe .................... G01C 3/08 |

OTHER PUBLICATIONS

"Written Opinion of the International Searching Authority for PCT Patent Application No. PCT/US2019/063893", dated Mar. 18, 2020, 7 Pages.

"Non-Final Office Action for U.S. Appl. No. 16/227,770", dated Jan. 15, 2021, 54 Pages.

"International Preliminary Report on Patentability for PCT Patent Application No. PCT/US2019/063893", dated Jun. 16, 2021, 8 Pages.

"Non-Final Office Action for U.S. Appl. No. 16/227,770", dated Aug. 25, 2021, 50 Pages.

"Reply to Non-Final Office Action for U.S. Appl. No. 16/227,770", filed May 17, 2021, 19 Pages.

"Response to the Office Action for European Patent Application No. 19828386.3" Filed Date: Jan. 6, 2022, 29 pages.

"Response to the Office Action for U.S. Appl. No. 16/227,770" filed Dec. 27, 2021, 19 pages.

"Notice of Allowance and Fees Due for U.S. Appl. No. 16/227,770" dated Feb. 14, 2022, 7 pages.

* cited by examiner

LIDAR SYSTEM THAT IS CONFIGURED TO COMPUTE RANGES WITH DIFFERING RANGE RESOLUTIONS

RELATED APPLICATION

This application is a continuation of U.S. patent application Ser. No. 16/227,770, filed on Dec. 20, 2018, and entitled "LIDAR SYSTEM THAT IS CONFIGURED TO COMPUTE RANGES WITH DIFFERING RANGE RESOLUTIONS", the entirety of which is incorporated herein by reference.

BACKGROUND

Autonomous vehicles (AVs) are vehicles that are able to travel over roadways without a human driver. An exemplary AV includes several types of sensor systems, including but not limited to a camera-based system, a global positioning systems (GPS), a radar system, a lidar system, etc. These sensor systems output sensor signals that are indicative of parameters of an environment in which the AV is traveling. The exemplary AV further includes a computing system that is configured to control operation of mechanical systems of the the AV based upon the sensor signals output by the sensor systems. Exemplary mechanical systems include, but are not limited to, a propulsion system (e.g., an electric motor, a combustion engine, a hybrid propulsion system, etc.), a braking system, and a steering system.

Reference is now made more specifically to operation of the lidar sensor system in the AV. Conventionally, the lidar sensor system is employed in several use cases, including object detection and avoidance, localization, and detection of ground truth. These different use cases operate in different range regimes and also require different range resolution. For example, with respect to an object (such as a vehicle or pedestrian) that is between 100 m and 200 m away from the AV, it may be sufficient to detect the object at a resolution of 5 cm to identify and track the object over time. Contrarily, to localize the AV in a geographic region at a desired accuracy (by comparing lidar outputs with a predefined map), it may be necessary to detect objects in a scene that are at a distance of between 35 m and 45 m from the autonomous vehicle at a resolution of 1 cm. Accordingly, and generally, it is desirable to compute distances to objects that are closer to the AV at a more granular resolution than is necessary when computing distances to objects that are further from the AV.

Accordingly, a conventional AV can include multiple sensor systems (one sensor system for each range). Therefore, in a specific example, the AV may include a first sensor system that is configured to compute distances to objects in a first range (e.g., 0-50 m) at a first resolution, and may include a second sensor system that is configured to compute distances to objects in a second range (e.g., 50-200 m) at a second resolution that is more coarse than the first resolution. This adds complexity and expense to the AV.

An exemplary type of lidar system that can be included in an AV is a frequency-modulated continuous wave (FMCW) lidar system. An FMCW lidar system exhibits several advantages over a direct time-of-flight (TOF) lidar system. For instance, the FMCW lidar system employs a coherent detection method, and therefore the FMCW lidar system is generally immune to interference, while performance of the TOF lidar system may be negatively impacted due to interference. Additionally, for the same output power per photon budget, the FMCW lidar system is able to achieve higher signal-to-noise compared to the TOF lidar system. In the conventional FMCW lidar system, however, once electronics and maximum detectable distance are set, resolution is independent of distance of an object from the lidar system. Put differently, resolution at which distance can be computed by the FMCW lidar system is the same across the entire sensing range of the FMCW lidar system. Hence, if it is desirable to both use FMCW lidar systems and have different range resolutions, multiple FMCW lidar systems having overlapping fields of view must be employed (e.g., one FMCW lidar system for short-range sensing and one FMCW lidar system for long-range sensing).

SUMMARY

The following is a brief summary of subject matter that is described in greater detail herein. This summary is not intended to be limiting as to the scope of the claims.

Described herein is a lidar system that is particularly well-suited for use in an autonomous vehicle (AV) (although other applications are contemplated). The lidar system described herein is configured to compute a distance between the lidar system and an object with a resolution that is dependent upon the distance between the object and the lidar system. For example, when the object is between 0 and 90 m from the lidar system, the lidar system can be configured to compute the distance with a first resolution (e.g., a resolution of 1 cm), while when the object is between 90 m and 200 m from the lidar system, the lidar system is configured to compute the distance with a second resolution (e.g., 5 cm) that is different from the first resolution. The ability to compute distances within different ranges with different resolutions is enabled through use of a piecewise linear modulation scheme, such that a lidar signal generated and emitted by the lidar system includes a frequency modulation (chirp) that has an up-chirp and a down-chirp (monotonically increasing or decreasing in frequency, respectively), and further wherein at least the up-chirp includes multiple linear segments that have different slopes. In a nonlimiting example, the up-chirp can include a first segment and a second segment that immediately succeeds the first portion, wherein the first segment has a first slope and the second segment has a second slope, and further wherein the first slope is greater than the second slope (i.e., the rate of change of frequency in the first segment of the up-chirp is greater than the rate of change of frequency in the second segment of the up-chirp).

As will be described in greater detail herein, the lidar system splits the lidar signal into two signals: a local oscillator (LO) that is kept local to the system, and an emitted signal that is transmitted into the world and may reflect from an object in the field of view of the lidar system, resulting in a return reflection. At the lidar system, the return reflection constructively interferes with the LO, and a sensor outputs an analog sensor signal that is indicative of such interference. An analog-to-digital converter (ADC) converts the analog signal to a digital signal (at a sampling rate of the ADC), and processing circuitry of the lidar system performs a Fast Fourier Transform (FFT) over a portion of the digital signal that corresponds to a period of the chirp, thereby forming a frequency signal that identifies one or more beat signals when the object is within the maximum range of the lidar system. A beat signal is indicative of an instantaneous difference between the frequency of the LO and the frequency of the return reflection.

Due to the piecewise linear nature of the up-chirp, two beat frequencies are represented in the frequency signal when the object is within a first range, while one beat frequency is represented in the frequency signal when the object is within a second range (which is non-overlapping with the first range). Once the range is detected, the processing circuitry of the lidar system performs different processing depending upon the detected range, such that lidar system computes the distance to the object with a first resolution when the object is within the first range and computes the distance to the object with a second resolution when the object is within the second range. Hence, in an example, when the processing circuitry determines that an object is between 0 and 90 m from the lidar system, the processing circuitry computes the distance with a first resolution; contrarily, when the processing circuitry determines that the object is between 90 and 200 m from the lidar sensor system, the processing circuitry computes the distance to the object at a second resolution that is less granular than the first resolution.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

DETAILED DESCRIPTION

Figure 1:
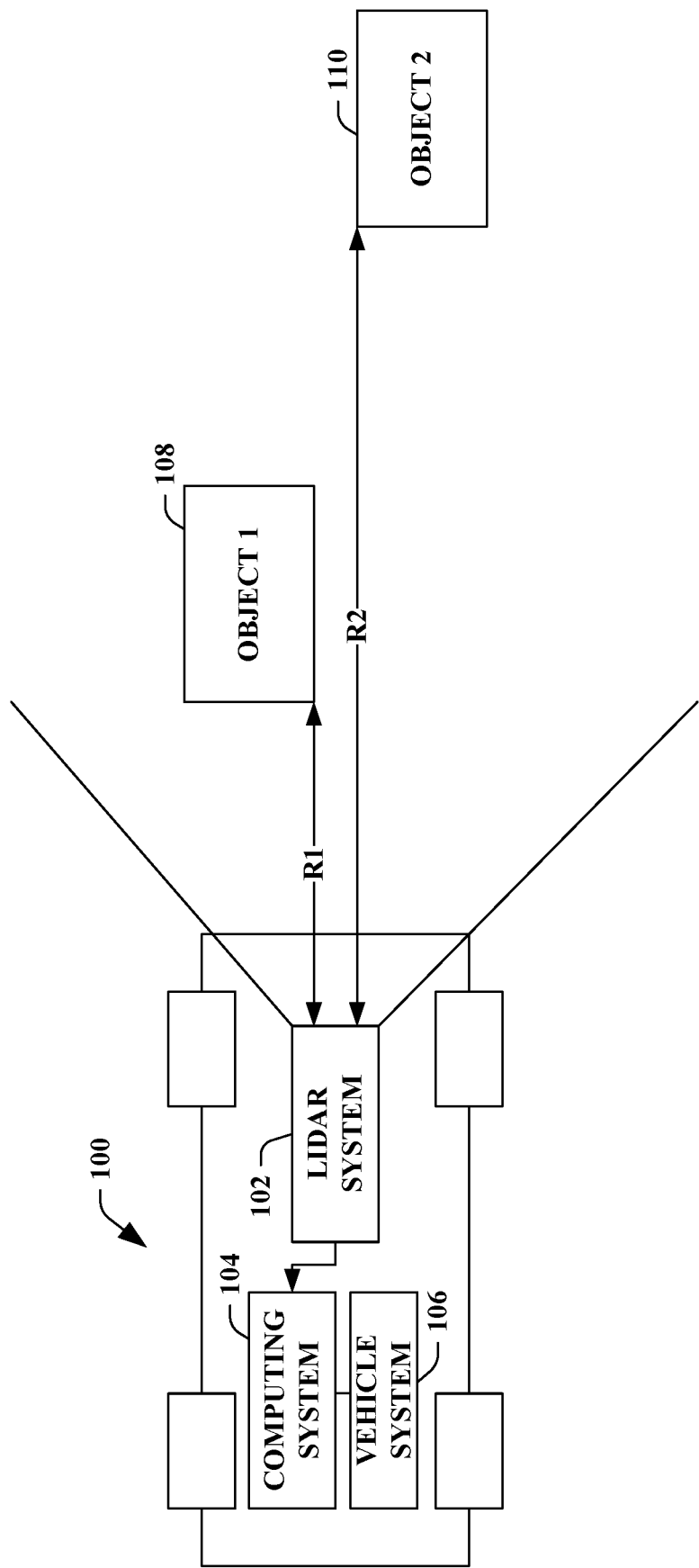
FIG. 1 is a functional block diagram of an exemplary autonomous vehicle (AV) that includes a lidar system, wherein the lidar system is configured to compute distances between the lidar system and objects in a field of view of the lidar system with range resolutions that are a function of such distances.

Various technologies pertaining to a lidar system that is configured to compute distances to objects, wherein the distances are computed with different resolutions depending upon the distances to the objects, are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Further, as used herein, the term "exemplary" is intended to mean "serving as an illustration or example of something."

Described herein is a lidar system that is particularly well-suited for use in an autonomous vehicle (AV). The lidar system employs frequency-modulation to generate lidar signals. In a specific example, the lidar system is a continuous wave frequency-modulated (FMCW) system. The lidar system described herein is configured to compute distances between the lidar system and objects in a field of view of the lidar system, wherein the distances are computed with different resolutions, and further wherein the resolutions are dependent upon the distances between the lidar system and the objects. For example, the lidar system is configured to compute a distance between the lidar system and an object that is close to the lidar system with a relatively granular resolution, while the lidar system is configured to compute a distance between the lidar system and an object that is far away from the lidar system with a relatively coarse resolution. The ability to compute distances to objects at different distances with different resolutions is an improvement over conventional lidar systems that employ frequency modulation to generate lidar signals, as conventional lidar systems compute distances to objects with invariant resolution regardless of the distance between an object and the lidar system.

With reference now to FIG. 1, an exemplary AV 100 is illustrated. The AV 100 includes a lidar system 102, wherein the lidar system 102 employs frequency modulation when generating lidar signals. For instance, the lidar system 102 can be an FMCW lidar system. While not illustrated, the AV 100 can include sensor systems of other types, such as camera-based vision systems, infrared systems, a global positioning system (GPS), etc. The AV 100 further includes a computing system 104 that is operably coupled to the lidar system 102, wherein the computing system 104 is configured to receive outputs generated by the lidar system 102. More specifically, the lidar system 102 is configured to output point clouds that are indicative of depths between the lidar system 102 and objects in a scene being scanned by the lidar system 102.

The autonomous vehicle 100 additionally includes a vehicle system 106 that is operably coupled to the computing system 104. The vehicle system 106 is a mechanical system that is used to maneuver the autonomous vehicle 100; accordingly, the vehicle system 106 can be a propulsion system (such as an electronic motor, a combustion engine, a hybrid system, etc.) a braking system, a steering system, or the like. The computing system 104 is configured to control the vehicle system 106 based upon outputs of the lidar system 102.

In the example depicted in FIG. 1, a first object 108 and a second object 110 are in a field of view of the lidar system 102. The first object 108 is at a range (distance) R1 from the lidar system 102 and the second object 110 is at a range R2 from the lidar system 102, wherein R2 is greater than R1. In accordance with aspects described herein, the lidar system 102 can compute R1 with a first resolution and can compute R2 with a second resolution, wherein the first resolution is different from the second resolution. In a specific example, the first resolution may be more granular than the second resolution—thus, the lidar system 102 is configured to compute distances to objects that are close to the lidar system 104 with a resolution that is more granular than resolution of distances computed for objects that are relatively far away from the lidar system 102.

Figure 2:
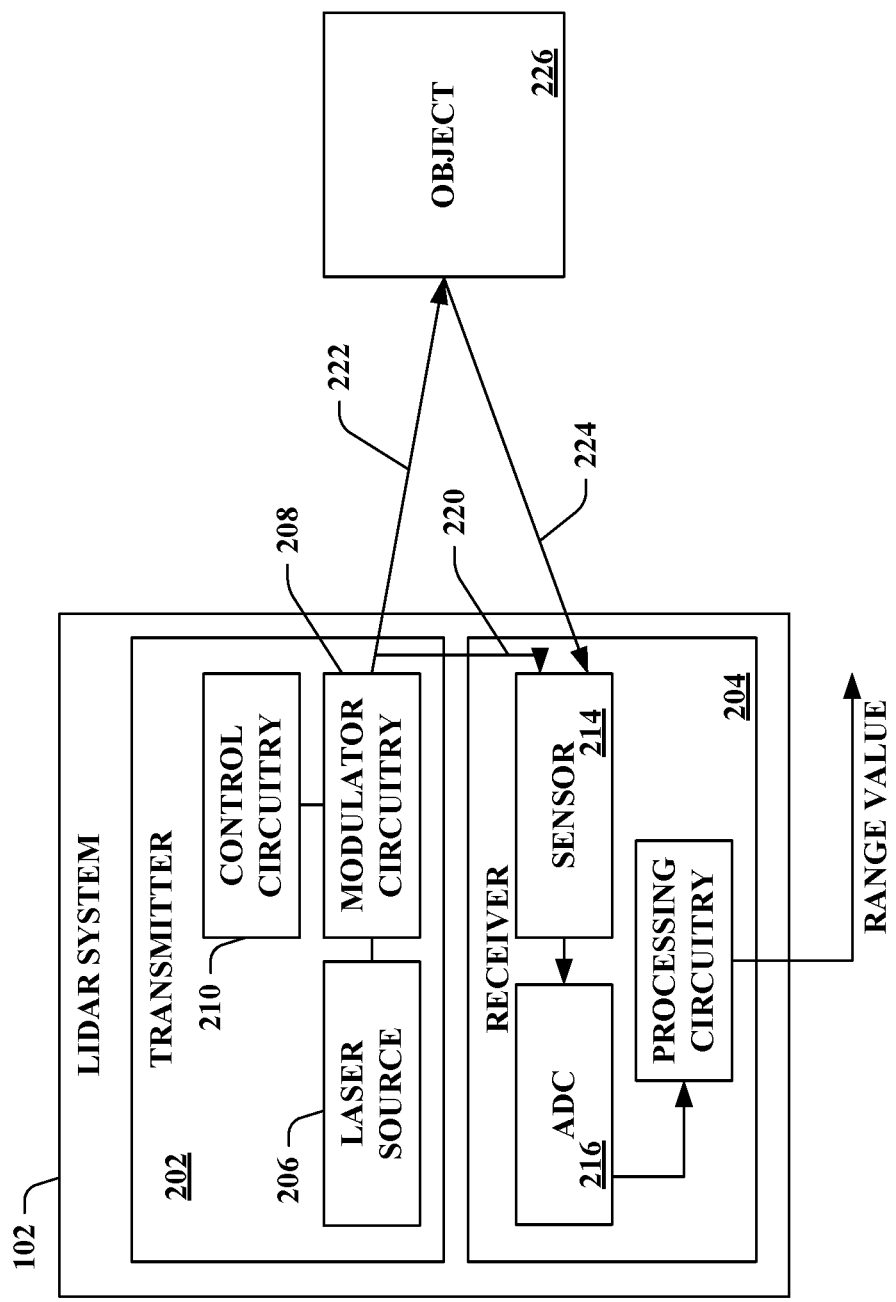
FIG. 2 is a functional block diagram of an exemplary lidar system.

Now referring to FIG. 2, a functional block diagram of the lidar system 102 is illustrated. The lidar system 102 includes a transmitter 202 and a receiver 204. Generally, the transmitter 202 is configured to generate and emit a frequency-modulated lidar signal and the receiver 204 is configured to compute distances to objects from which emitted lidar signals have reflected.

The transmitter 202 includes a laser source 206, such as a laser diode. The transmitter 202 further includes a modulator 208 that is configured to frequency-modulate radiation emitted from the laser source 206. The modulator 208 is a circuit or device (which is electrical, optical, or electro-optical in nature) that in conjunction with the laser source 206 produces a light output, wherein frequency of the light is made to vary. The shape of the frequency variation, for example a frequency chirp whereby the frequency is altered linearly with time, can be set by adjusting the electrical and/or optical parameters of the modulator 208. The transmitter 202 further includes control circuitry 210 that is configured to control the modulator 208, such that the modulator 208 frequency-modulates radiation emitted by the laser source 206 as desired. Specifically, and as will be described in greater detail herein, the control circuitry 210 is configured to control the modulator 208 such that a lidar signal output by the modulator 208 includes a frequency chirp, wherein the chirp comprises a piecewise linear up-chirp. More particularly, the up-chirp includes multiple linear segments, each with a different slope (i.e., each with a different rate of change of frequency). In a still more specific example, the slopes of the linear segments in the up-chirp can be successively decreasing across the up-chirp. Thus, the up-chirp includes a first linear segment with a first slope (i.e., a first rate of change of frequency) followed by a second linear segment with a second slope (i.e., a second rate of change of frequency), wherein the second slope is less than the first slope. The down-chirp of the chirp can be a piecewise linear down-chirp with negative slopes that correspond to the slopes of the up-chirp. In an example, a chirp can consist of four linear segments having slopes in the following order: $\xi_1$, $\xi_2$, $-\xi_1$, $-\xi_2$. Further, $\xi_1 = k\xi_2$, wherein k is a user-defined constant. This piecewise linear modulation scheme allows for the lidar system 102 to compute distances to objects with resolutions that are non-identical to one another.

The receiver 204 comprises a sensor 214, wherein the sensor 214 can be a photodetector or any other suitable sensor that is configured to detect a lidar signal and output an analog sensor signal based upon the lidar signal. The receiver 204 additionally comprises an analog to digital converter (ADC) 216 that is operably coupled to the sensor 214, wherein the ADC 216 is configured to convert the analog sensor signal output by the sensor 214 to a digital signal. The receiver 204 also includes processing circuitry 218 that is operably coupled to the ADC 216. The processing circuitry 218 is configured to compute a distance between the lidar system 102 and one or more objects in a field of view of the lidar system 102 based upon the digital signal output by the ADC 216. While the control circuitry 210 and the processing circuitry 218 are illustrated as being separate modules in different portions of the lidar system 102, it is to be understood that this arrangement is presented for purposes of explanation. For instance, the control circuitry 210 and the processing circuitry 218 can be included in a single hardware module. Further, the control circuitry 210 and/or the processing circuitry 218 can be implemented in microprocessor(s), digital signal processor(s) (DSPs), application-specific integrated circuit(s) (ASICs), field-programmable gate array(s) (FPGAs), etc.

Operation of the lidar system 102 relative to a conventional lidar system is now described in greater detail. In a conventional FMCW lidar system, the frequency of radiation emitted from the lidar system is modulated and chirped in a periodic fashion f(t), and the modulated radiation is split into two branches, a local oscillator (LO) (represented by line 220) that is kept local to the lidar system 102 and an emitted beam (represented by line 222) that is sent out into the world. A return reflection (represented by line 224) is captured by the sensor 214, and due to the time delay of the round-trip, the instantaneous frequency of the return reflection 224 is $$f\left(t - \frac{2R}{c}\right),$$

where c is the speed of light and R is the distance between the lidar system 102 and an object 226 from which the emitted beam 222 reflects. The return reflection 224 interferes coherently with the LO 220 at the sensor 214, resulting in the sensor 214 outputting a sensor signal that is representative of a beat frequency $$f = \text{abs}\left[f(t) - f\left(t - \frac{2R}{c}\right)\right].$$

Modulation schemes used in conventional lidar systems include a sawtooth or triangular wave. Because such modulation schemes are linear, the beat frequency remains constant. In AV settings, typically a triangle wave is preferably used in a modulation scheme, since the return reflection includes radial Doppler velocity information.

Figure 9:
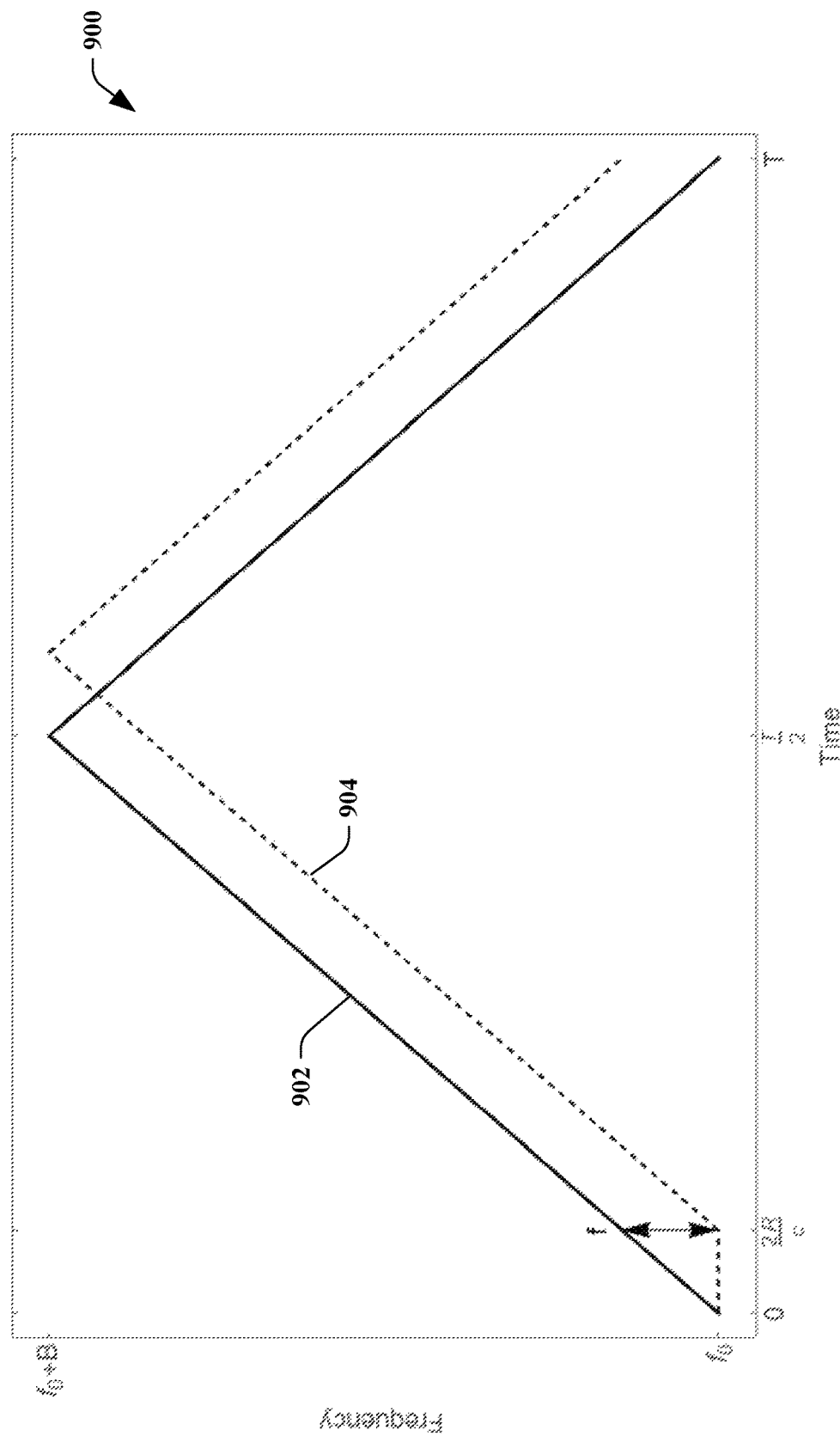
FIG. 9 is a chart that illustrates an LO and a return reflection when a conventional linear modulation scheme is employed to generate lidar signals.

Referring to FIG. 9, a chart 900 illustrating the LO 220 and the return reflection 224 when a conventional linear modulation scheme (e.g., a chirp having a triangle waveform with a period T and total bandwidth excursion B) is employed when modulating radiation emitted from the modulator 208. A solid line 902 represents the LO 220, while a dashed line 904 represents the return reflection 222 from the object 226. The lines 902 and 904 have a slope $$\xi = \frac{2B}{T},$$

and the beat frequency f is related to ξ as follows:

$$f = \frac{2R}{c}\xi. \qquad (1)$$

Thus, the range R (the distance between the lidar system 102 and the object 226) and the beat frequency f have a linear relationship that is proportional to the slope of the chirp.

Figure 10:
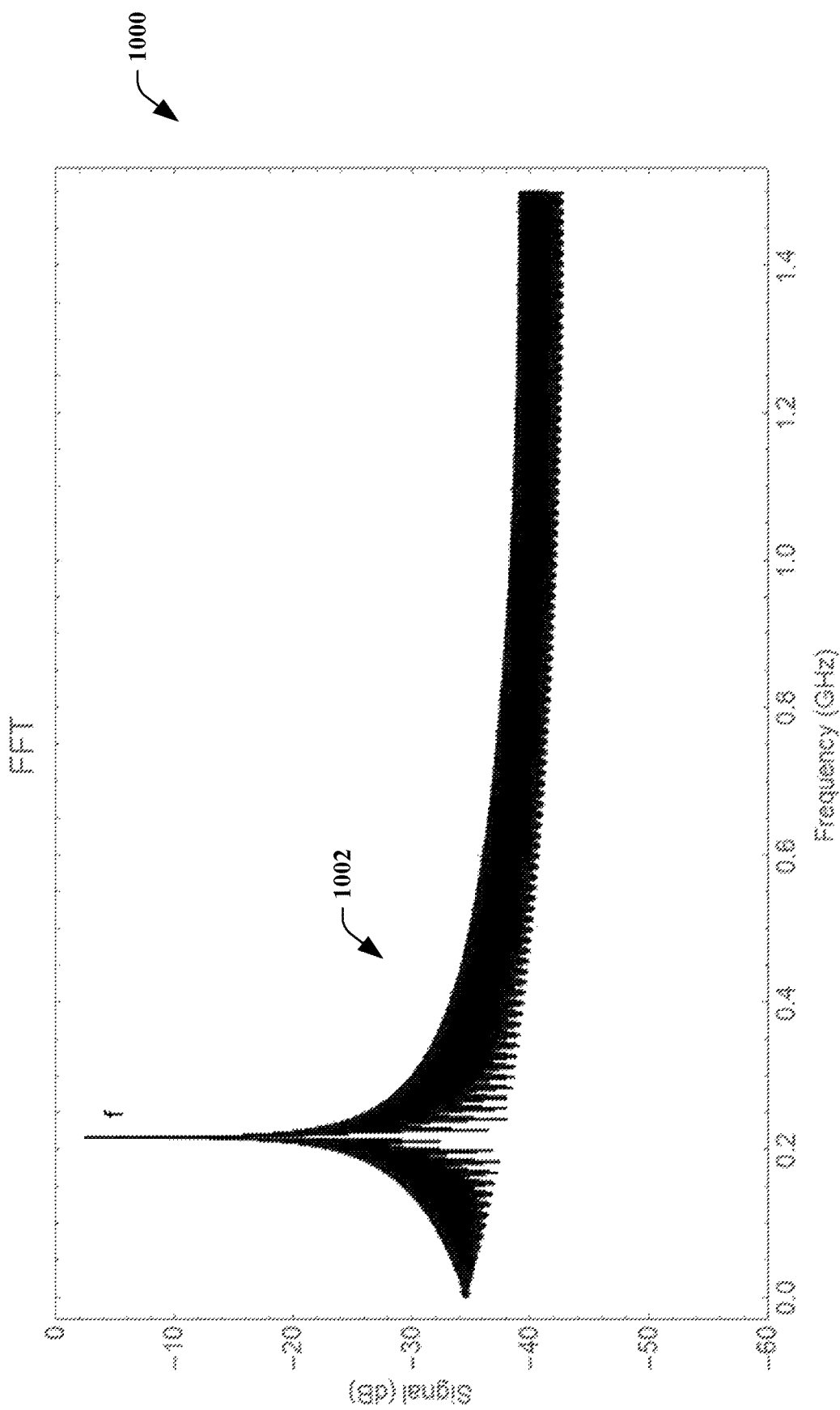
FIG. 10 illustrates a frequency signal that corresponds to the LO and the reflected return depicted in FIG. 9.

As noted above, the LO 220 and the return reflection 224 constructively interfere at the sensor 214, and the sensor outputs an analog sensor signal that is representative of a beat signal. The ADC 216 converts the analog sensor signal to a digital signal and outputs the digital signal. The processing circuitry 218 performs an FFT on the digital signal to form what is referred to herein as a frequency signal. Referring briefly to FIG. 10, a chart 1000 illustrating a frequency signal 1002 that corresponds to the LO 220 and the return reflection 224 as depicted in FIG. 9 is presented. The beat signal frequency f is the peak of the frequency signal 1002 depicted in FIG. 10.

While the beat frequency f is analog, the resolution at which the beat frequency f can be measured is limited by the sampling rate $F_{ADC}$ of the ADC 216. More specifically, for a given capture or "pixel", the ADC 216 captures N samples at the rate of $f_{ADC}$, and so the bin width (resolution bandwidth (RBW)) of the FFT performed by the processing circuitry 218 is $$\Delta f = \frac{f_{ADC}}{N}.$$

The range resolution ΔR at which the processing circuitry 218 can compute the range to the object 226, without any additional resolution enhancements in post-processing (such as peak interpolation or oversampling), is as follows:

$$\Delta R = \frac{c}{2\xi}\Delta f = \frac{c}{2\xi}\frac{f_{ADC}}{N} \qquad (2)$$

Resolution enhancements used in post-processing can additionally be employed to further improve resolution. In the limit where the period of the chirp T is also the pixel time N×$f_{ADC}$=T, Eq. (2) takes the form $$\Delta R = \frac{c}{4B}.$$

When the lidar system 102 utilizes the conventional modulation scheme illustrated in FIG. 9, the range resolution is invariant across the entire range of the lidar system 102.

Figure 3:
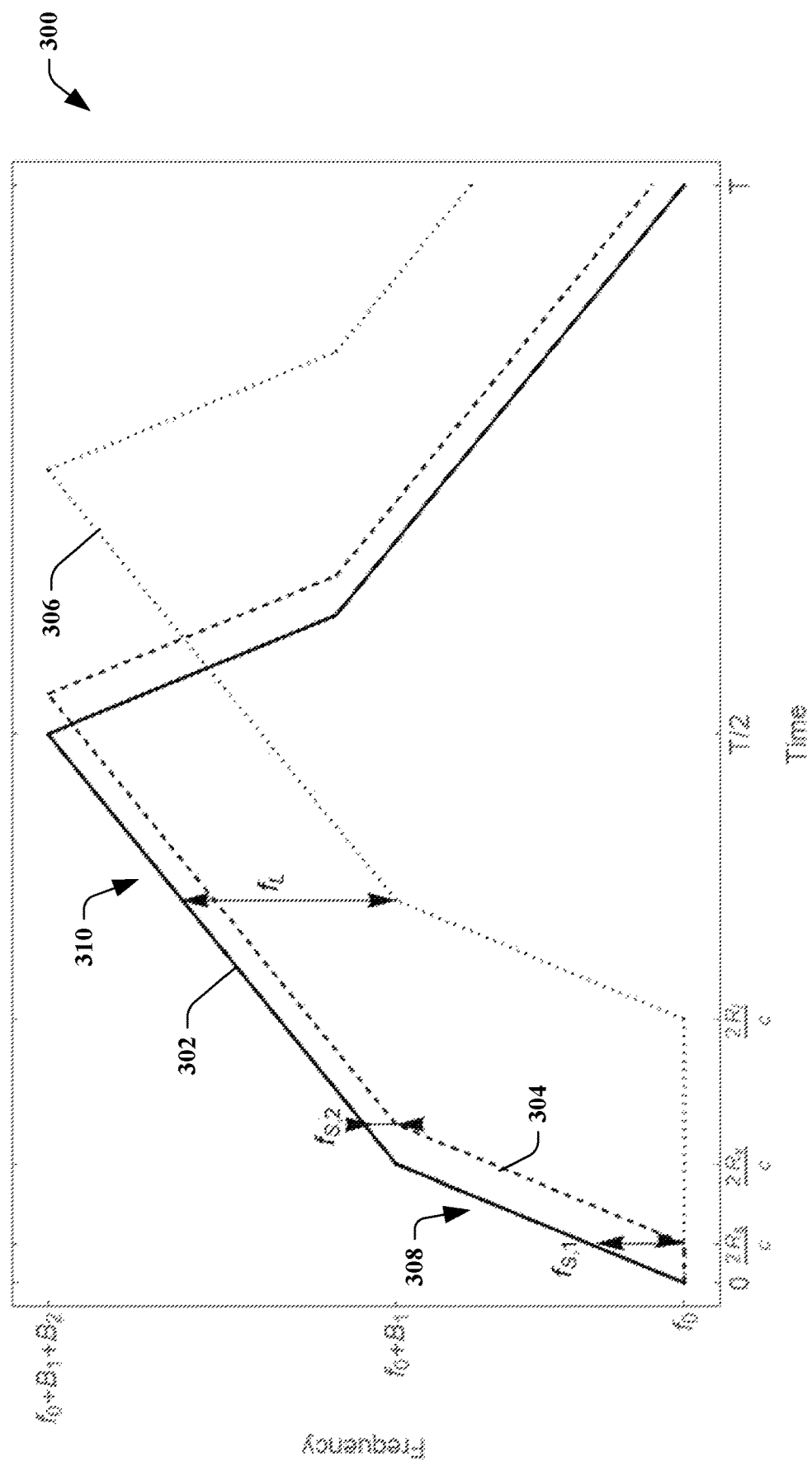
FIG. 3 is a chart that illustrates a local oscillator (LO), a first return reflection, and a second return reflection, wherein the LO and return reflections exhibit a piecewise linear frequency modulation scheme that is employed to generate lidar signals.

Now referring to FIG. 3, a chart 300 depicting a piecewise linear modulation scheme that is employed by the lidar system 102 to allow for different range resolutions is illustrated. The chart 300 includes a solid line 302 that represents the LO 220 as a function of time, a dashed line 304 that represents the return reflection 224 when the object 226 is within a short range from the lidar system 102 (e.g., within 90 m), and a dotted line 306 that represents the return reflection 224 when the object 226 is within a long range from the lidar system 102 (e.g., between 90 m and 200 m). In contrast to the up-chirp of the signal represented in FIG. 9, the up-chirp of the lidar signal emitted from the modulator 208 is piecewise linear, such that different segments of the up-chirp have different slopes.

For example, and with reference to the line 302, the up-chirp of the LO 220 includes a first segment 308 with a first slope $\xi_1$ and a second segment 310 with a second slope $\xi_2$, wherein $\xi_1 > \xi_2$. While the up-chirp is illustrated as consisting of two linear segments, it is to be understood that a piecewise linear up-chirp can be configured to include more than two linear segments (e.g., an up-chirp can include between two and five linear segments). In the exemplary chart 300, the up-chirp of the LO 220 represented by the line 302 is specified by two parameters: 1) $R_x$, the equivalent range where the lidar system 102 switches from short-range to long-range mode; and 2) k, the ratio of the two chirps ($\xi_1$=k×$\xi_2$), where k is user-specified (which may be equivalently considered as specifying bandwidths $B_1$ and $B_2$, which respectively correspond to the segment 308 and 310). In an exemplary embodiment, k>1. In other words, successive segments in the up-chirp have decreasing slopes in order to result in a monotonically decreasing range resolution. As illustrated in FIG. 3, the line 304 represents a "short-range return" when the object 226 is at some distance $R_S \leq R_x$ from the lidar system 102 and the line 308 is a "long-range return" when the object 226 is at some distance $R_S > R_x$ from the lidar system 102. It is also to be noted that, due to signal-to-noise characteristics associated with the lidar system 102, effective short-range returns may occur for a distance $R_{x'}$ that is less than $R_x$. In an exemplary embodiment, $$R_{x'} = \frac{R_x}{2}.$$

$R_x$ can then be selected such that $R_{x'}$ meets the requirements of the application of the lidar system 102.

When the short-range return interferes with the LO 220 at the sensor 214, the short-range return overlaps with both segments 308 and 310 of the up-chirp in the LO 220. Accordingly, the sensor 214 outputs an analog sensor signal that exhibits two beat frequencies $f_{S1}$ and $f_{S2}$. These beat frequencies, as well as the associated range resolutions, are related by k as follows:

$$f_{S1} = \frac{2R}{c}k\xi_2 = kf_{S2}; \qquad (3)$$

$$\Delta R_{S1} = \frac{c}{2k\xi_2}\frac{f_{ADC}}{N} = \frac{1}{k}\Delta R_{S2}$$

In contrast, when the long-range return interferes with the LO 220 at the sensor 214, the long-range return overlaps with the second segment 310 but not the first segment 308; hence, the sensor 214 outputs an analog sensor signal that represents a single beat frequency $f_L$.

Figure 4:
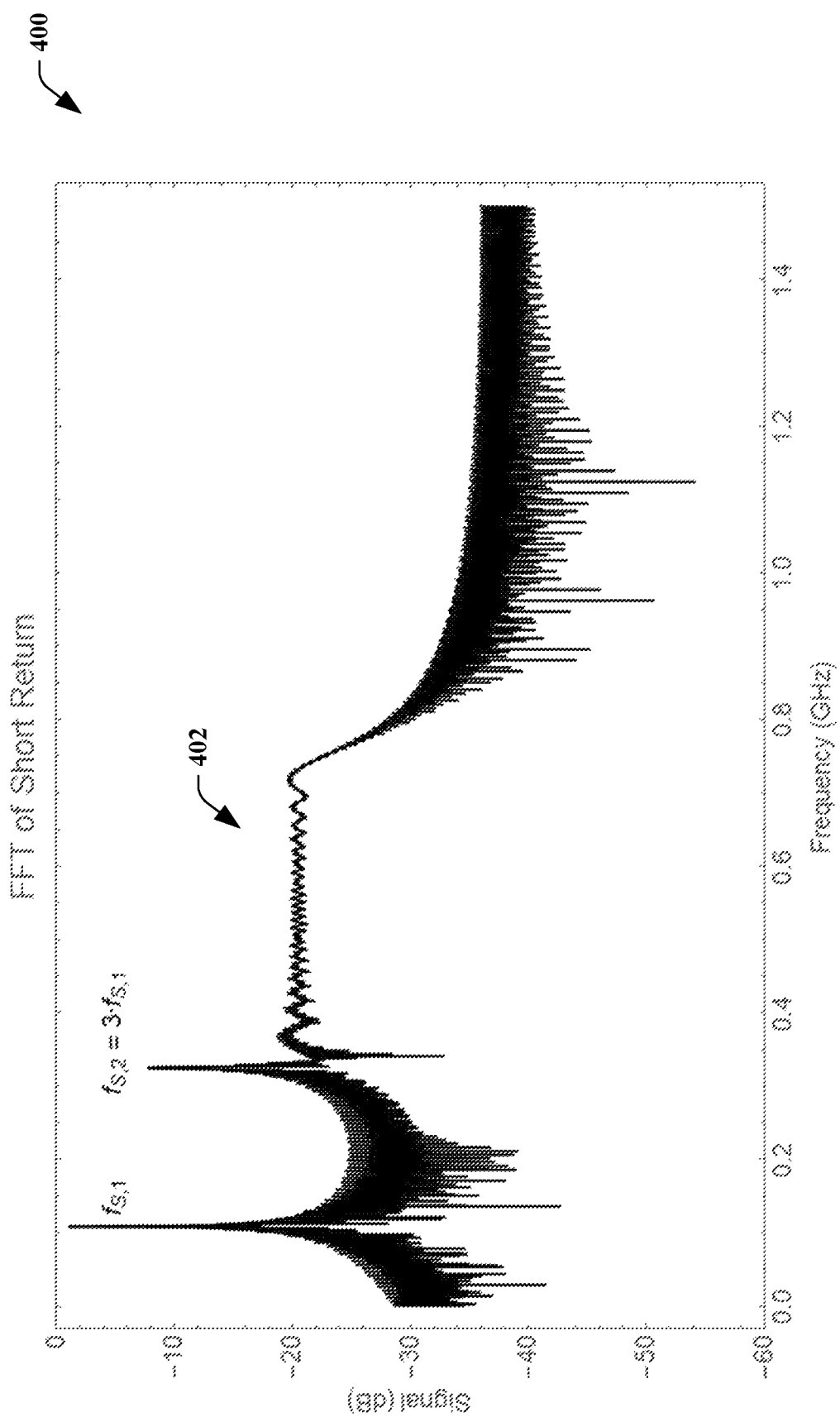
FIG. 4 illustrates a frequency signal that corresponds to the LO and the first reflected return depicted in FIG. 3.
Figure 5:
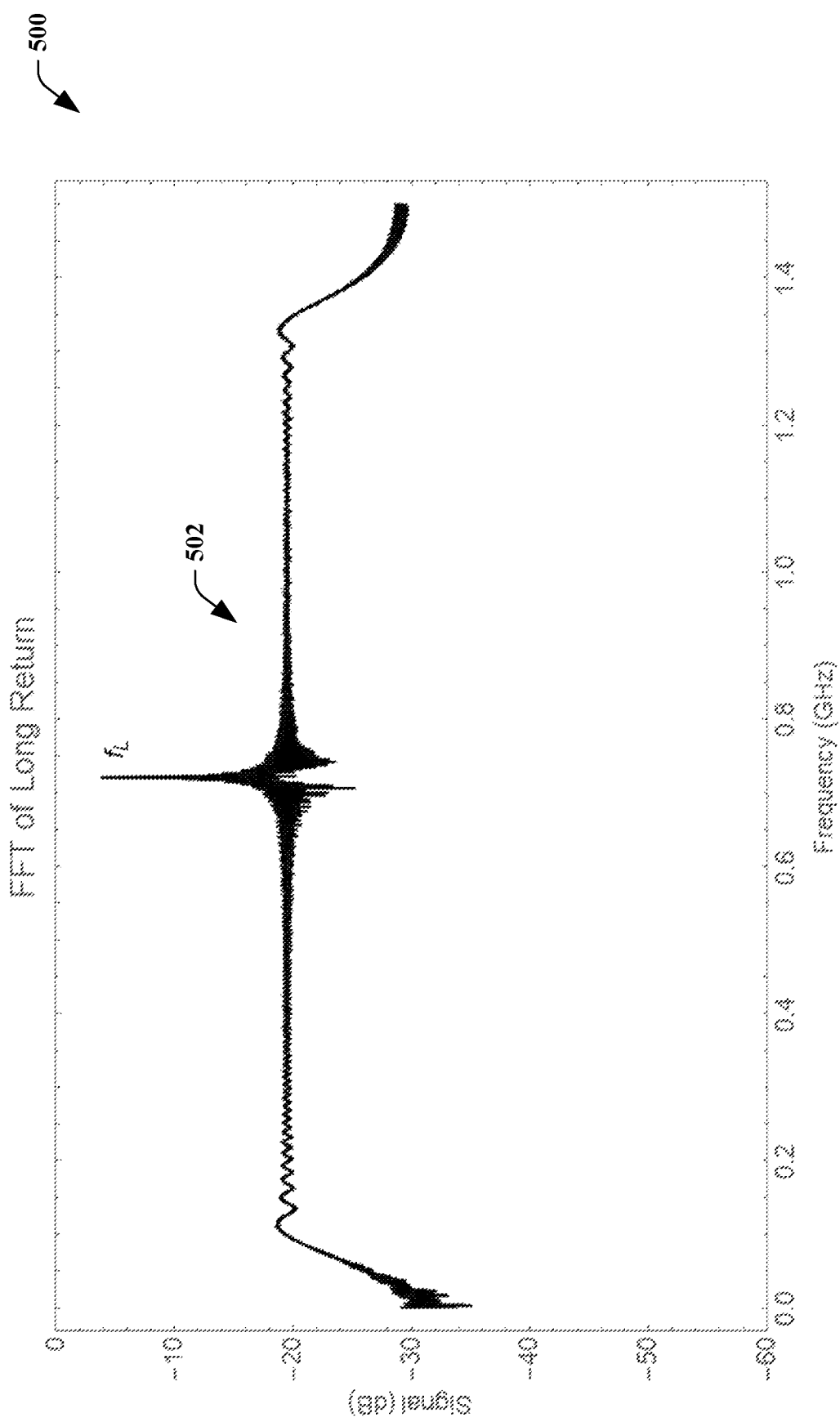
FIG. 5 illustrates a frequency signal that corresponds to the LO and the second reflected return depicted in FIG. 3.

FIG. 4 is a chart 400 that depicts a frequency signal 402 output by the processing circuitry 218 when the processing circuitry 218 performs an FFT on a digital signal output by the ADC 216 when the short-range return interferes with the LO 220. The frequency signal 402 has two peaks that represent the two beat frequencies $f_{S1}$ and $f_{S2}$, which are proportional to one another by k. Referring briefly to FIG. 5, a chart 500 is presented that depicts a frequency signal 502 output by the processing circuitry 218 when the processing circuitry 218 performs an FFT on a digital signal output by the ADC 218 when the long-range return interferes with the LO 220. The frequency signal 502 includes a single peak that represents the beat frequency $f_L$. In FIGS. 3-5, $R_x$=90 m, k=3, the range to the object 226 that corresponds to the short-range return depicted in FIG. 3 is $R_S$=30, and the range to the object 226 that corresponds to the long-range return depicted in FIG. 3 is $R_L$=200.

Returning to FIG. 2, the control circuitry 210 is configured with $R_x$ and k, as defined by a user and/or the computing system 104 (or some other computing system). The control circuitry 210 controls the modulator 208, such that the modulator 208 modulates radiation emitted by the laser source 206 to cause the lidar signal output from the modulator 208 to include a piecewise linear up-chirp and a piecewise linear down-chirp (such as depicted in FIG. 3). In the example shown in FIG. 2, a beam splitter can be used to direct a portion of the lidar signal to the sensor 214 as the LO 220 while the emitted signal 222 is transmitted out into the world. The emitted signal 222 impinges upon the object 226, resulting in the return reflection 224 being directed back towards the sensor 214. The return reflection 224 constructively interferes with the local oscillator 220 at the sensor 214, and the analog sensor signal output by the sensor 214 is representative of such interference. The ADC 216 receives the analog sensor signal and generates a digital signal based thereon, where the digital signal has N data points per chirp period T (e.g., based upon the sampling rate of the ADC 216). The processing circuitry 218 performs an FFT over the N data points, thus generating a frequency signal. The processing circuitry 218 is further configured to perform peak detection in the frequency signal.

When the frequency signal includes a single peak, the processing circuitry 218 computes a range to the object 226 with a range resolution that is computed based upon Eq. 2, wherein the processing circuitry computes the range to the object 108 based upon the peak frequency in the frequency signal. When the frequency signal includes two peaks, the processing circuitry 218 determines whether the two peaks are related by k. When the two peaks are not related by k, the processing circuitry 218 computes a range to the object 226 based upon the stronger peak and with a resolution defined by Eq. 2. In an alternative embodiment, for a multiple return lidar scheme, a range (& resolution) can be returned for each peak with a resolution defined by Eq. 2. When the two peaks are related by k, the range is computed using the second peak (i.e., the peak with frequency $f_{S2}$) with a resolution defined by Eq. 3. The processing circuitry 218 outputs a computed range value, wherein resolution of the range value is a function of a distance between the lidar system 102 and the object 226. As indicated previously, the computing system 104 can then control the vehicle system 106 based upon computed range values output by the processing circuitry 218.

It is also contemplated that $R_x$ can be dynamically altered, depending upon content of the scene being imaged by the lidar system 102. Hence, for example, the computing system 104 can track objects based upon output of the lidar system 102—depending upon location(s) of object(s) how the location(s) of the object(s) change over time, the computing system 104 can cause $R_x$ to be altered, such that the resolution(s) and/or resolution range(s) can be altered (e.g., to allow for object(s) to be tracked more granularly, to allow object(s) in the foreground to be better distinguished from background noise, and so forth).

FIGS. 6-9 illustrate exemplary methodologies relating to a lidar system that is configured to compute ranges to objects with different range resolutions, depending upon distances between the lidar system and the objects. While the methodologies are shown and described as being a series of acts that are performed in a sequence, it is to be understood and appreciated that the methodology is not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions may include a routine, a sub-routine, programs, a thread of execution, and/or the like. Still further, results of acts of the methodologies may be stored in a computer-readable medium, displayed on a display device, and/or the like. As used herein, the term "computer-readable medium" does not encompass a propagated signal.

Figure 6:
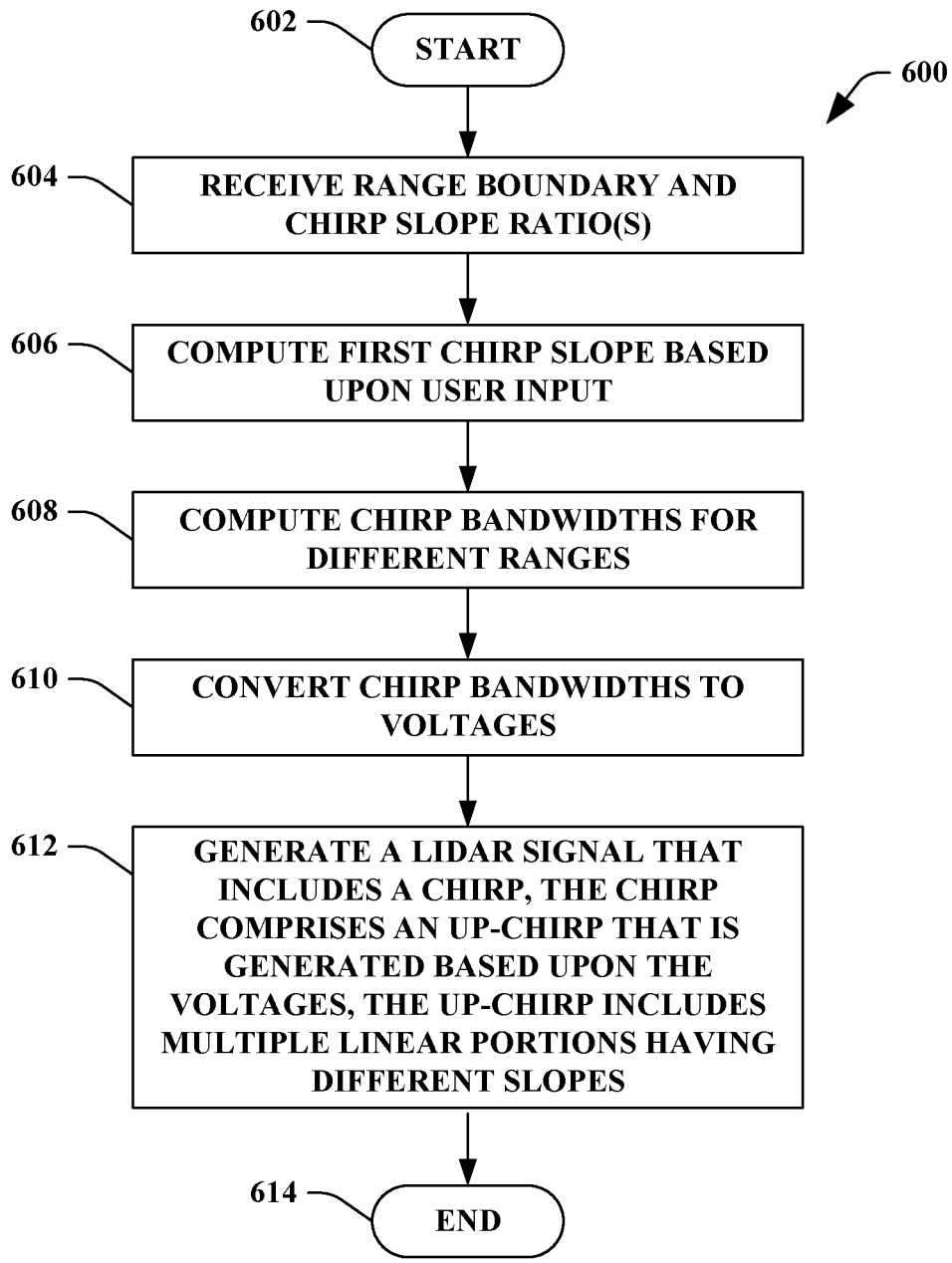
FIG. 6 is a flow diagram illustrating an exemplary methodology for generating a lidar signal that includes a piecewise linear up-chirp.

Now referring to FIG. 6, an exemplary methodology 600 performed by the control circuitry 210 is presented. The methodology 600 starts at 602, and at 604 a range boundary $R_x$ and an up-chirp slope ratio k are received. At 606, chirp segment slopes in an up-chirp are computed based upon the factors received at 604. At 608, bandwidths for each chirp segment are computed. For instance, when the up-chirp has two segments, bandwidths for such segments can be computed as follows:

$$B_1 = k\xi_2 \frac{2R_x}{c} \qquad (4)$$

$$B_2 = \xi_2\left(\frac{T}{2} - \frac{2R_x}{c}\right) = kB_1\left(\frac{cT}{4R_x} - 1\right)$$

At 610, the bandwidths are converted to voltages, and at 612 the modulator 208 is controlled to cause the lidar system 102 to generate a lidar signal that includes the chirp, where the chirp comprises an up-chirp that is generated based upon the voltages, and further wherein the up-chirp includes multiple linear segments having different slopes that are related by k. While the control circuitry 210 is described as being separate from the modulator 208, it is to be understood that functions described as being undertaken by the control circuitry 210 and the modulator 208 may be performed by a single module. The methodology 600 completes at 614.

Figure 7:
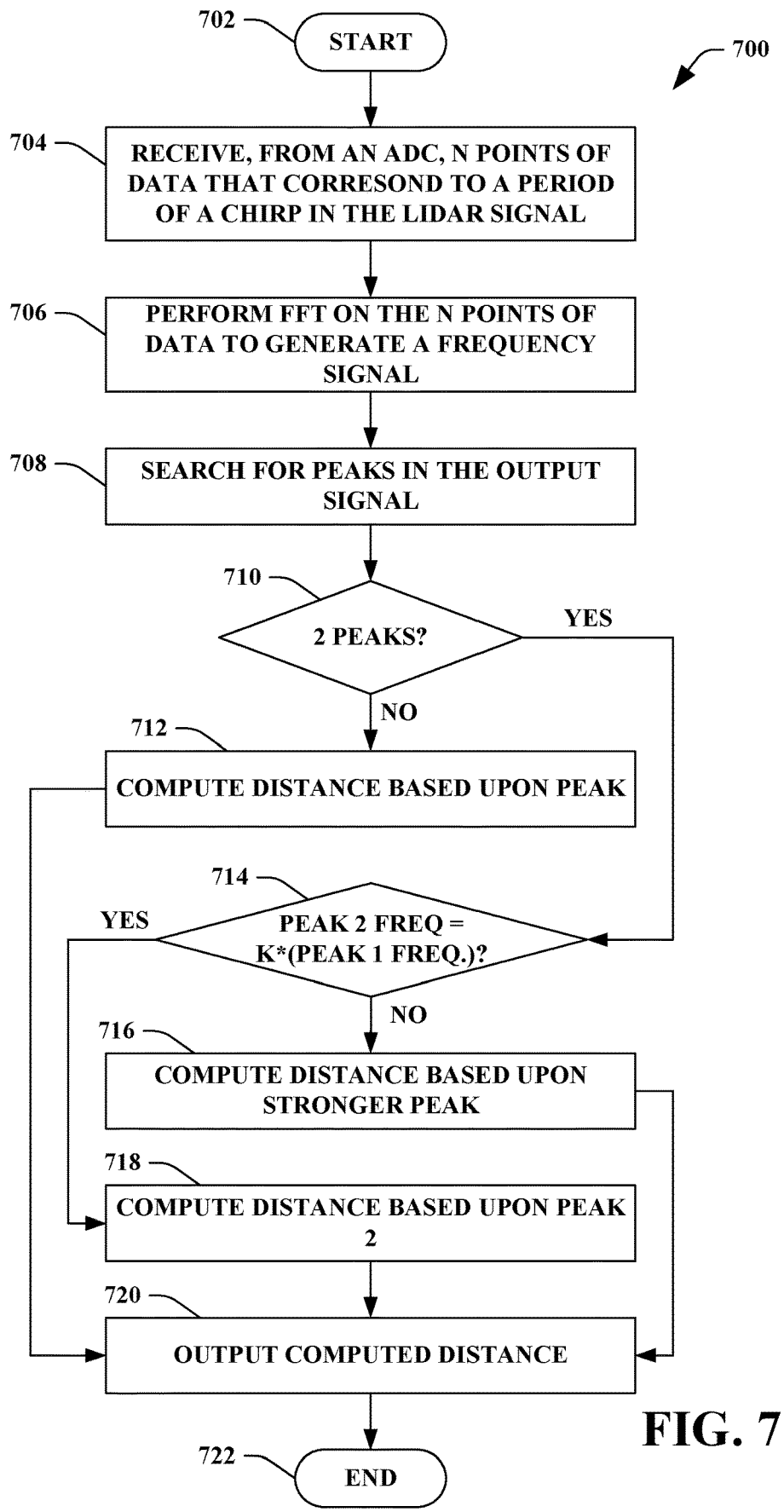
FIG. 7 is a flow diagram illustrating an exemplary methodology for computing a distance to an object based upon a return reflection.

Now referring to FIG. 7, an exemplary methodology 700 that is performed by the processing circuitry 218 is illustrated. The methodology 700 starts at 702, and at 704 N points of data are received from the ADC 216, wherein the N points of data correspond to a time period of a chirp in a lidar signal. At 706, an FFT is performed on the N points of data to generate a frequency signal. At 708, the frequency signal is analyzed to identify any peaks therein. At 710, a determination is made regarding whether there are two peaks in the frequency signal. If there is a single peak (not two peaks), then the methodology 700 continues to 712, where distance to an object is computed based upon the frequency at the peak.

If it is determined at 710 that there are two peaks in the frequency signal, then at 714 a determination is made at to whether the two peaks are related by k (e.g., the frequency of the first peak is k times the frequency of the second peak). If it is determined at 714 that the two peak frequencies in the frequency signal are not related by k, then at 716 distance to the object is computed based upon the stronger peak. If it is determined at 714 that the two peak frequencies are related by k, the methodology 700 proceeds to 718, where a distance to the object is computed based upon the second peak frequency (i.e., the frequency with the lower amplitude in the frequency signal). After the distance is computed at 712, 716, or 718, the methodology 700 proceeds to 720, where the computed distance is output. The methodology 700 completes at 722.

Figure 8:
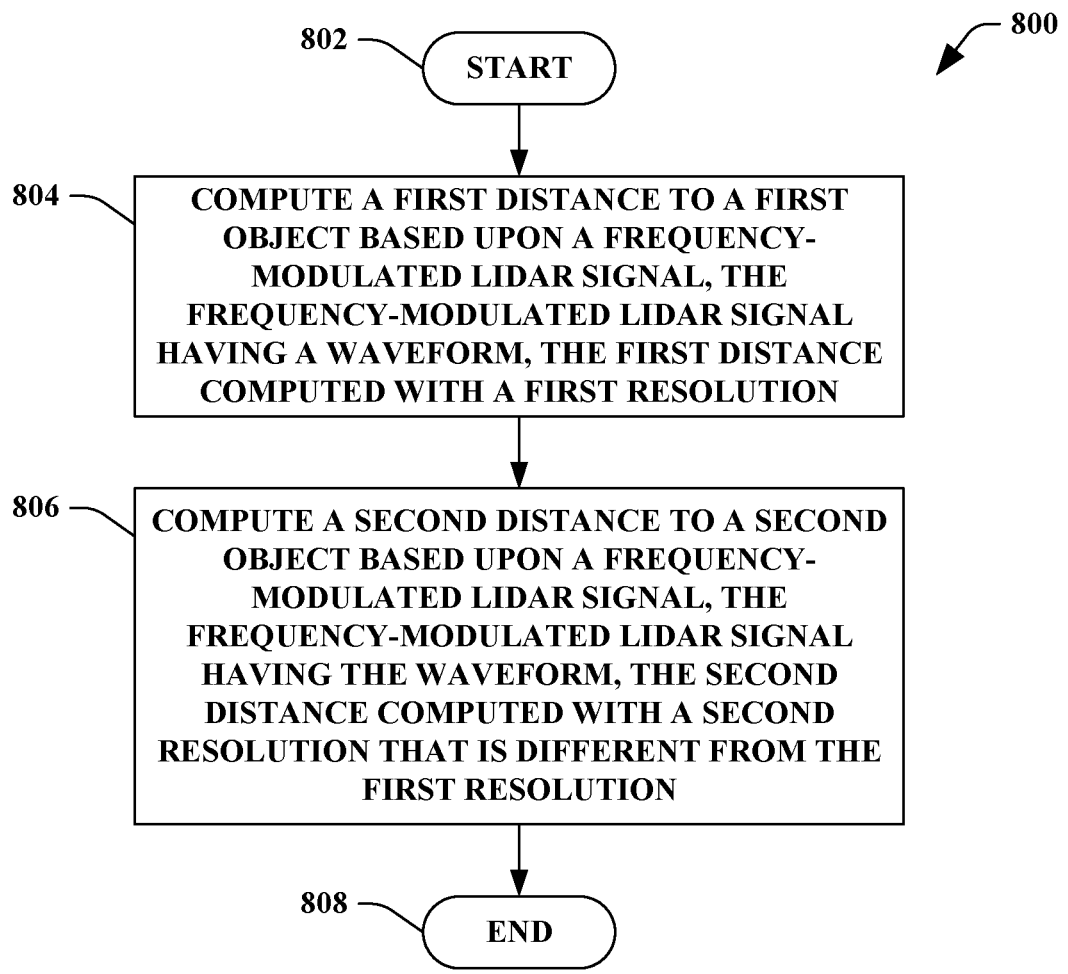
FIG. 8 is a flow diagram illustrating an exemplary methodology for computing distances to different objects at different ranges with different range resolutions.

Now referring to FIG. 8, an exemplary methodology 800 is illustrated, wherein the methodology 800 facilitates computing distances between a lidar system and objects with two different resolutions, wherein the resolutions are a function of the distances between the lidar system and the objects. The methodology 800 starts at 802, and at 804 a first distance to a first object is computed based upon a frequency-modulated lidar signal, wherein the frequency-modulated lidar signal has a waveform, and further where the first distance is computed with a first resolution. At 806, a second distance to a second object is computed based upon a frequency-modulated lidar signal, where the frequency-modulated lidar signal has the waveform, and further wherein the second distance is computed with a second resolution that is different from the first resolution. The methodology 800 completes at 808.

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer. Disk and disc, as used herein, include compact disc (CD), laser disc, optical disc, digital versatile disc (DVD), floppy disk, and blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the scope of the appended claims. Furthermore, to the extent that the term "includes" is used in either the details description or the claims, such term is intended to be inclusive in a manner similar to the term "comprising" as "comprising" is interpreted when employed as a transitional word in a claim.

What is claimed is:

1. A lidar system, comprising:
a transmitter that is configured to emit a frequency-modulated lidar signal, the frequency-modulated lidar signal includes a piecewise linear frequency up-chirp, where the piecewise linear frequency up-chirp includes a first portion having a first frequency slope with respect to time immediately followed by a second portion having a second frequency slope with respect to time that is different from the first frequency slope, wherein the first frequency slope corresponds to a first distance range and the second frequency slope corresponds to a second distance range; and
a receiver that is configured to compute a distance between an object and the lidar system, wherein the lidar system is configured to compute the distance with a first resolution when the object is within the first distance range, wherein the lidar system is configured to compute the distance with a second resolution when the object is within the second distance range, wherein the first resolution is based upon the first frequency slope and the second resolution is based upon the second frequency slope, and further wherein the lidar system is configured to update the non-overlapping ranges and corresponding resolutions for the ranges as the distance between the object and the lidar system changes over time.

2. The lidar system of claim 1, wherein a first size of the first range and a second size of the second range are based upon a first length of time of the first portion and a second length of time of the second portion, respectively.

3. The lidar system of claim 2, wherein the first portion is adjacent to the second portion in the piecewise linear frequency up-chirp.

4. The lidar system of claim 3, wherein the first range is adjacent to the second range.

5. The lidar system of claim 4, wherein $R_x$ represents a point in time in the piecewise linear frequency up-chirp when the first portion ends and the second portion starts, and further wherein the transmitter is configured to alter the point in time represented by $R_x$ based upon the distance between the object and the lidar system.

6. The lidar system of claim 5, further comprising a computing system that is configured to track positions of the object over time based upon distances computed by the receiver, and further wherein the computing system causes the transmitter to alter the point in time represented by $R_x$ based upon the tracked positions of the object over time.

7. The lidar system of claim 6, wherein the computing system causes the transmitter to alter the point in time represented by $R_x$ such that the first size of the first range is decreased and the first resolution is increased.

8. The lidar system of claim 1, wherein the receiver is operably coupled to a computing system of an autonomous vehicle (AV), and further wherein the computing system of the AV controls at least one of a steering system, a braking system, or a propulsion system based upon the distance computed by the receiver.

9. An autonomous vehicle (AV) comprising:
a lidar system that is configured to output distances to an object in a field of view of the lidar system, wherein the lidar system comprises a transmitter that is configured to output a frequency-modulated lidar signal that comprises a piecewise linear frequency up-chirp, wherein the piecewise linear frequency up-chirp comprises a first portion that is immediately followed by a second portion, the first portion having a first slope and the second portion having a second slope; and
a computing system that is configured to:
track positions of the object over time based upon the distances output of the lidar system;
cause the lidar system to update non-overlapping ranges and corresponding resolutions for the ranges based upon the positions of the object tracked over time by the computing system, wherein the lidar system is configured to output a distance to the object with a first resolution when the object is within a first range and is further configured to output the distance to the object with a second resolution when the object is within a second range that is non-overlapping with the first range, wherein the lidar system outputs the distance to the object based upon the frequency-modulated lidar signal, wherein the first resolution is based upon the first slope and the second resolution is based upon the second slope, and further wherein causing the lidar system to update the non-overlapping ranges and corresponding range resolutions comprises updating sizes of the first range and the second range and updating resolutions for the first range and the second range.

10. The AV of claim 9, wherein the computing system is further configured to control at least one of a steering system, a braking system, or a propulsion system based upon the distance to the object output by the lidar system.

11. The AV of claim 9, wherein the first portion ends and the second portion begins within the piecewise linear frequency up-chirp at a point in time that is represented by $R_x$, and further wherein a size of the first range is based upon the point in time represented by $R_x$.

12. The AV of claim 11, wherein the frequency-modulated lidar signal comprises a sequence of piecewise linear frequency up-chirps, and further wherein causing the lidar system to update the non-overlapping ranges and corresponding resolutions for the non-overlapping ranges comprises causing the lidar system to alter a position of the point in time represented $R_x$ in different piecewise linear frequency up-chirps in the sequence of piecewise linear frequency up-chirps.

13. A method performed by a lidar system, the method comprising:
emitting a first piecewise linear frequency up-chirp as a portion of a frequency-modulated lidar signal, wherein the first piecewise linear frequency up-chirp includes a first portion immediately followed by a second portion, the first portion having a first slope and the second portion having a second slope;
computing a first distance between the lidar system and an object based upon the first piecewise linear frequency up-chirp, wherein the first distance is computed with one of a first resolution or a second resolution depending upon the first distance between the lidar system and the object;
emitting a second piecewise linear frequency up-chirp as a second portion of the frequency-modulated lidar signal, wherein the second piecewise linear up-chirp includes a third portion immediately followed by a fourth portion, the third portion having a third slope and the fourth portion having a fourth slope, wherein the first slope, the second slope, the third slope, and the fourth slope are different from one another; and
computing a second distance between the lidar system and the object based upon the second piecewise linear frequency up-chirp, wherein the second distance is computed with one of a third resolution or a fourth resolution depending upon the second distance between the lidar system and the object, wherein the first resolution, the second resolution, the third resolution, and the fourth resolution are different from one another.

14. The method of claim 13, further comprising:
prior to emitting the second piecewise linear frequency up-chirp, defining, based upon the first distance, a point in the second piecewise linear up-chirp where the third portion ends and the fourth portion begins; and
emitting the second piecewise linear frequency up-chirp responsive to defining the point.

15. The method of claim 13, wherein the first resolution is more granular than the third resolution.

16. The method of claim 13, wherein the first resolution is less granular than the third resolution.

17. The method of claim 13, wherein the lidar system computes the first distance at the first resolution when the first distance is less than a first predefined threshold, and further wherein the lidar system computes the first distance at the second resolution when the second distance is greater than the first predefined threshold and less than a second predefined threshold.

18. The method of claim 17, wherein the lidar system computes the second distance at the third resolution when the second distance is less than a third predefined threshold, wherein the third predefined threshold is less than the first predefined threshold.

19. The AV of claim 9, wherein the first range is adjacent to the second range.

20. The AV of claim 9, wherein the piecewise linear frequency up-chirp comprises a third portion having a third slope that is different from the first slope and the second slope, wherein the lidar system is configured to output the distance to the object with a third resolution when the object is within a third range, wherein the third resolution is based upon the third slope.

* * * * *